S. PEARSON.

Bed-Bottoms.

No. 5,604. Reissued Oct. 14, 1873.

WITNESSES:

W. H. Dodge.

Harold G. Underwood

INVENTOR:

Samuel Pearson, by Dodgeson

Attys.

AM. PHOTO-LITHOGRAPHIC Co. N.Y. (OSBORNE'S PROCESS.)

UNITED STATES PATENT OFFICE.

SAMUEL PEARSON, OF CINCINNATI, OHIO, ASSIGNOR TO EMANUEL G. GORY.

IMPROVEMENT IN BED-BOTTOMS.

Specification forming part of Letters Patent No. 49,434, dated August 15, 1865; reissue No 5,604, dated October 14, 1873; application filed September 3, 1873.

*To all whom it may concern:*

Be it known that I, SAMUEL PEARSON, of Cincinnati, in the county of Hamilton and State of Ohio, have invented a new and useful Improvement in Bed-Bottoms; and I do hereby declare that the following is a full, clear, and exact description thereof, which will enable others skilled in the art to make and use the same, reference being had to the accompanying drawings forming part of this specification, in which—

Figure 1:
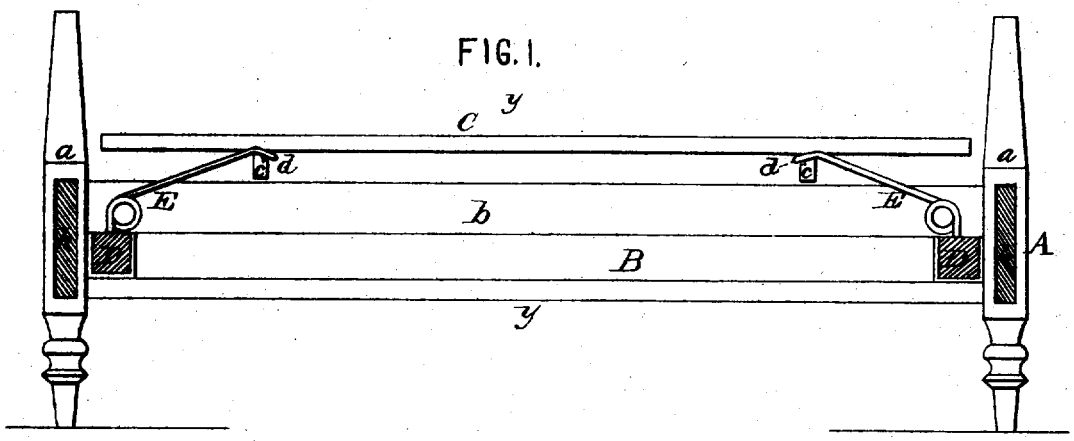
Figure 2:
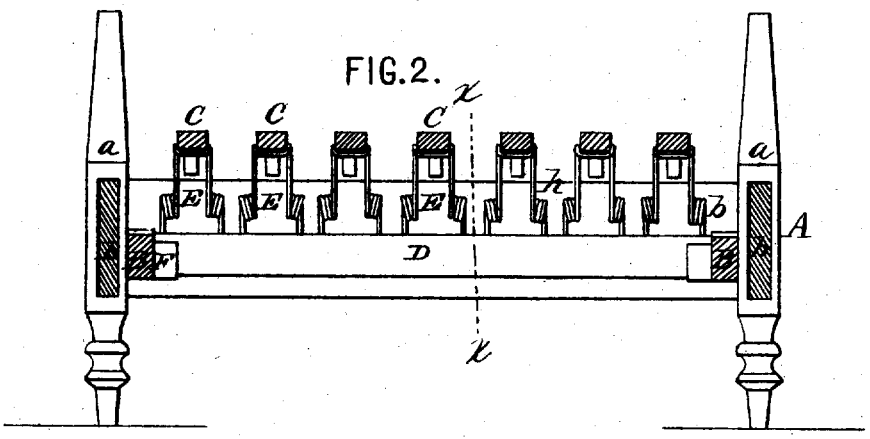
Figure 3:
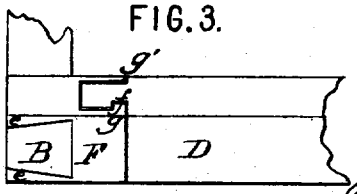
Figure 4:
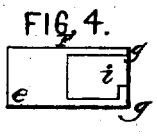

Figure 1 is a longitudinal vertical section of a bed-bottom made according to my invention, together with a like section of a bedstead-frame. Fig. 2 is a transverse vertical section thereof. Fig. 3 is a detailed view of one of the corners of the bed-bottom to show the joint. Fig. 4 is a representation of the socket by which the joint is secured.

Similar letters of reference indicate like parts.

This invention has reference, mainly, to that class of bed-bottoms in which the slats are sustained by springs having double helices, substantially such as shown in the drawings; and its objects are, first, to so construct and arrange the springs severally with reference to the slats to be sustained that the slats may be made to extend the full length of the bed, and thereby the bedding may be prevented from sagging at the ends; second, to keep each slat firmly in its place, preventing lateral motion without binding the slats together, which would prevent their separate reversibility and interfere with the elasticity of the several springs; third, to so connect each slat to its sustaining-spring that it may be removed therefrom and reversed without interfering with the other slats; none of which objects were accomplished in bed-bottoms of this class prior to the date of my invention; and fourth, to more securely joint the ends of the rails together.

A represents a bedstead-frame, composed of parts *a*, side boards *b*, and end boards *h*, made in the usual manner. It is here shown supporting my bed-bottom, whose frame, made up of two side rails, B, and two end rails, D, rests upon cleats fixed within the bedstead-frame. The ends of the end rails D are square, and are placed against the inner sides next the ends of the side rails B, in such way as that the ends of the rail B shall be flush with the outer faces of the end rails D. In this position they are secured to each other by means of a double socket-joint piece, F, of peculiar shape, which is shown separately in Fig. 4 in top view. This joint-piece is most conveniently and cheaply made by casting. The end of the rail B is received in a socket formed by the angular sides *e e*, that portion of the rail which rests therein being formed to a dovetail. The opposite side of the joint-piece F has also a socket open only on its upper side; its side *g'* being plain, the opposite side, *g*, having a lip, which takes into a vertical groove, *f*, cut on the outer face of the rail D, and the bottom edges of the sides *g g'* being united by a bottom piece, *i*, which supports the end of the rail D, as shown in Fig. 4. A joint-piece of like construction is placed on each joint of the bed-bottom. The springs which support the slats C are designated by the letter E. They are each formed of one piece of wire, (or the piece *d* may be a separate piece rigidly fastened to the two sides of the spring,) so that their two sides are connected to make a double-sided spring, whose ends are properly secured in the rails D. Their sides rise on an inclination which takes a direction inward from the rail D. Immediately before the sides of the springs are connected by the cross-pieces *d*, they descend somewhat, so that the cross-portions *d* are sufficiently lower than the highest points of the sides of the springs to form beds or bent stirrups, within which the slats may severally lie, the width of the slats being equal to the length of the cross-pieces *d* of the springs. The sides of the springs brace the edges of the slats, and thereby prevent their lateral displacement, as is shown in Fig. 1. The most economical and convenient mode of using these bent stirrups is to place them underneath the slats, as shown. There being no obstruction between the two helices of each spring, the slats C may be of a length equal to that of the bed-bottom. Each slat has a pin, *c*, inserted through it near each end. These pins are slotted transversely on their inner sides, as seen in Fig. 1, and, as shown, their length is twice the thickness of the slat plus the vertical length of the slot. Their area in cross-section will depend upon their form in such section somewhat, but more upon the character of the material from which such pins or attachments may be made. The slots receive the cross-portions of the springs, and thereby securely fasten each slat to its springs, the tension of the springs causing their cross-portions to constantly draw against the pins *c*, and thus keep the slats securely connected with the pins when the springs are not pressed down by a weight on the slats; and when such weight is removed from the slat the notches in the pins will catch and hold the cross-portions of the springs.

The slats may be made of any suitable number and material, and, if any of them should become sprung or bent from long-continued use, they can be turned over, and the pins be pushed or driven through, so as to bring their slots on the opposite sides of the slats, the slots being made in the middle of the length of the pins for this purpose.

My slats are severally removed, when desired, by depressing a spring at one end separately from the slat sustained by such spring to release the pin or attachment from the spring, and they are replaced in the same manner.

As shown in the drawings, my mode of connecting the described springs to the reversible slats (and which is the best mode in which I have contemplated applying this principle of my invention) consists of cylindrical slotted pins adjustable vertically in the mortise of the slat; and this form answers the purpose of a secure connection, and permits a convenient mode of reversing the slat. The use of pins for this purpose makes a more secure connection than if the spring were attached directly to the slat; and putting the pin through the slat vertically is deemed rather the better mode of connecting it with the spring, as the end of the pin used for reversing the slat, which, in the mode shown, being below the slat, cannot interfere with the bedding, and because it has less tendency to weaken the slat than any other mode of attachment, and, consequently, the slats may be thinner, saving material, and giving greater elasticity.

Prior to the date of my invention the bent stirrups shown upon my springs, for the purpose of preventing lateral displacement of the slats, was not used for that purpose; and hence spring bed-bottoms having double helical springs then in use either had all the slats fastened together by a strap, which prevented their reversibility, and interfered with the operation of the different springs, as in the case of Whipple's patent, dated October 25, 1859, or the slats were rigidly fastened to the springs, and consequently not reversible, as in Tucker's patent, dated July 3, 1855.

Having thus described my invention, what I desire to secure by Letters Patent, is—

1. The combination of the pin *c* with the slat C, substantially as described.

2. The spring E, having double helices with spaces between them, through which a slat the full length of the bed may pass without obstruction, substantially as and for the purposes described.

3. A bed-bottom in which the slats are disconnected from each other, and sustained by springs E having the bent stirrups *d* to prevent lateral displacement of the slats, substantially as shown and described.

4. In combination, a reversible slat, C, spring E, adjustable pin *c*, substantially as and for the purposes described.

SAMUEL PEARSON.

Witnesses:
JAMES MOORE,
GEORGE J. MURRAY.